United States Patent [19]

Mezey

[11] 3,978,979

[45] Sept. 7, 1976

[54] APPARATUS FOR ARRANGING, SEPARATING AND POSITIONING OF ITEMS BEING CONVEYED

[75] Inventor: Sandor Mezey, Budapest, Hungary

[73] Assignee: Egyesult Izzolampa ES Villamossagi RT, Budapest, Hungary

[22] Filed: Mar. 14, 1975

[21] Appl. No.: 558,502

[52] U.S. Cl. .............................. 198/394; 198/626; 198/688
[51] Int. Cl.². ....................................... B65G 47/14
[58] Field of Search ............. 209/73; 198/282, 285, 198/287, 264, 283, 247, 255, 278, 281

[56]  References Cited
UNITED STATES PATENTS

| | | | |
|---|---|---|---|
| 2,764,351 | 9/1956 | Broscomb et al. | 198/287 X |
| 3,326,350 | 6/1967 | Cromer et al. | 198/287 |
| 3,517,797 | 6/1970 | Daleffe et al. | 198/287 X |
| 3,655,027 | 4/1972 | Douglas et al. | 198/287 X |

*Primary Examiner*—Allen N. Knowles

[57] ABSTRACT

Apparatus for conveying a plurality of individual items in series by two spaced parallel movable endless conveying elements. The items each have a bulbous portion and a neck portion, and travel with the bulbous portion uppermost and the neck portion between the conveying elements. In accordance with the invention, there are provided elements for regulating the positioning of the items arranged on the adjacent sides of the conveying elements.

2 Claims, 6 Drawing Figures

APPARATUS FOR ARRANGING, SEPARATING AND POSITIONING OF ITEMS BEING CONVEYED

This invention relates to an apparatus for the arranging, separating and positioning of individual items having a bulbous portion and a neck portion, such as incandescent electric lamp bulbs.

Intensive increases in automation and productivity require attendant operations which have usually been carried out by hand to be mechanized also. Thus mechanical processes are used instead of human labor. These processes include the feeding, arranging and positioning of semi-finished goods which are dealt with as bulk goods.

The invention is primarily concerned with the arranging, separating and positioning of incandescent lamp bulbs but can also be used for other individual items which comprise a bulbous portion and a neck portion and can be positioned by making use of their center of gravity, for example, bulbs, television picture tubes or cathode ray tubes.

For the sake of simplicity, however, only incandescent lamp bulbs will be hereinafter referred to.

According to hetherto known methods, incandescent lamp bulbs are conveyed by a slideway, provided, for example, with rollers, and by the use of a channel. But it was found that this solution does not insure correct arranging, positioning and separating (for the sake of simplicity these three operations will be hereinafter referred to as "arranging").

A further development consisted in arranging for the bulbs coming from the said channel to pass between two endless conveying elements the spacing of which from one another was less than the greatest width of the incandescent lamp bulb. Of course, the two conveying elements travel at the same speed. In theory, this solution was completely suitable for arranging work but in actual practice it was found that because of the method of arranging it was not suitable for positioning since it was not insured that the bulbs moved along the channel between the two conveying elements, such as belts or ropes, with the neck portion of the bulb downwards. The invention has as its object the elimination of this disadvantage.

Moreover, the invention provides an apparatus for the arranging, separating and positioning of individual items which comprise a bulbous portion and a neck portion and lie between continuously or intermittently moving endless conveying elements (ropes, belts,), such items being, for example, bulbs, television picture tubes, cathode ray tubes, etc. The apparatus may be characterized as comprising regulating elements which are arranged at the two sides of the conveying element and are secured to the guide rails of the conveying elements and which in the direction at right angles to the conveying element are arranged at a distance from one another corresponding to the transition width between the bulbous portion and neck portion of the individual item being conveyed, for example, an incandescent lamp bulb, and in the direction of the conveyer belt at a spacing from one another corresponding at least to the diameter of the bulbous portion of the bulb, and a regulating element which is one to three times as long as the transition width between the neck portion and bulbous portion of the bulb.

In the apparatus according to the invention, the regulating elements can be arranged opposite one another or offset relatively to one another in the longitudinal direction, but they are always arranged parallel to one another.

The invention will now be explained, by way of example, with reference to the accompanying drawings wherein.

In incandescent lamp production, the bulbs of the incandescent lamps are produced by a separate machine (not shown) and are produced as bulk semi-finished products. At the manufacturing station they are generally put into cardboard boxes. From these boxes they are fed in bulk to the feed unit (not shown). The function of this unit is continuously to supply an amount of bulbs suitable for the output of the machine from the several thousand bulbs situated in the said unit to the lamp machine.

Figure 2:
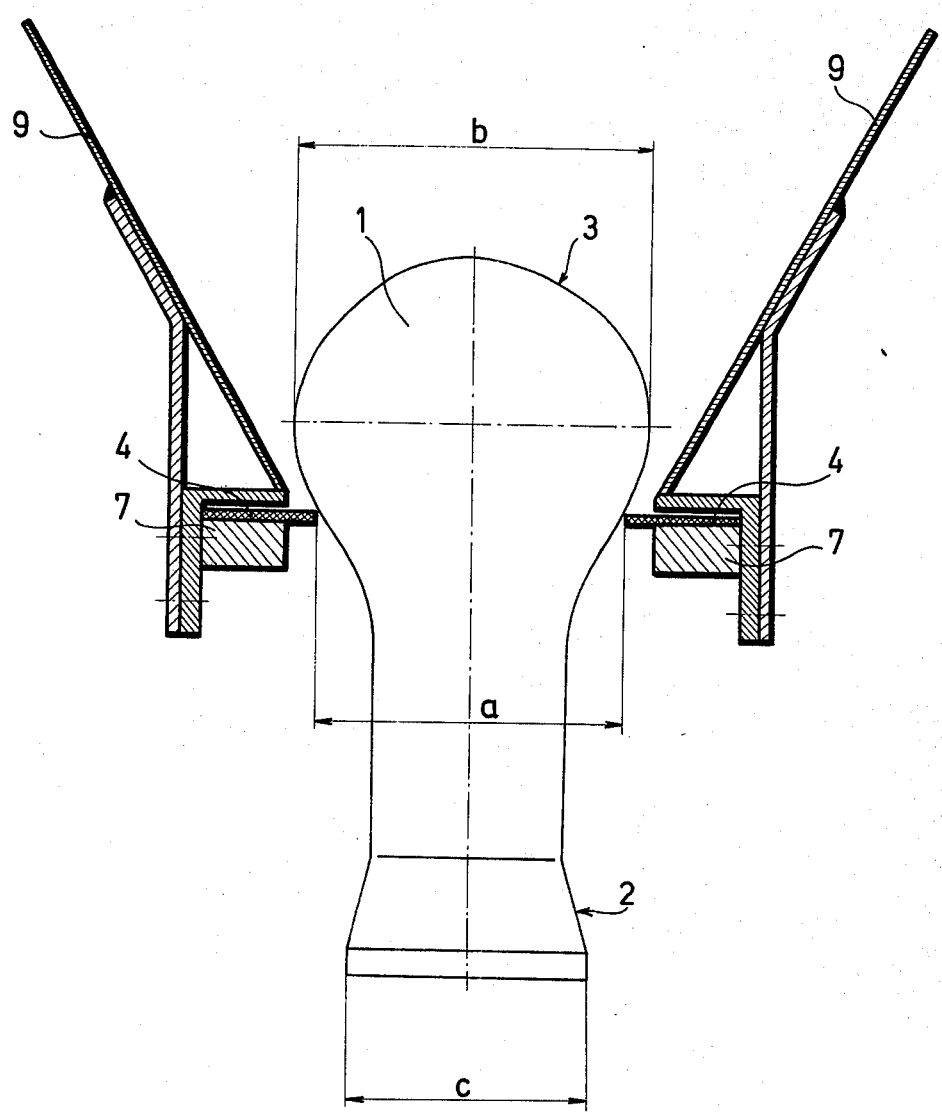
FIG. 2 shows by way of example one constructional form of the apparatus according to the invention, except for the incandescent lamp bulb situated between the conveying elements, all the components being shown in cross-section.

From the feed unit lamp bulbs 1 pass on to a channel 8 and from there onto a conveyor comprising two conveying elements 4, two converging side walls 9, and two guide rails 7. The two conveying elements 4, e.g. belts or ropes, are parallel to one another and their spacing $a$ from one another (as shown in FIG. 2) is smaller than the largest dimension $b$ of the bulbous portion 3 of the glass bulb 1, but larger than the dimension $c$ of the neck portion 2. The two conveying elements 4 travel at the same speed. The glass bulbs 1 are conveyed by the conveying elements 4 into a separating unit the purpose of which is to allow a suitable quantity of bulbs 1 situated in a suitable position per unit of time to pass into the corresponding unit of the lamp-producing row of machines.

Figure 1:
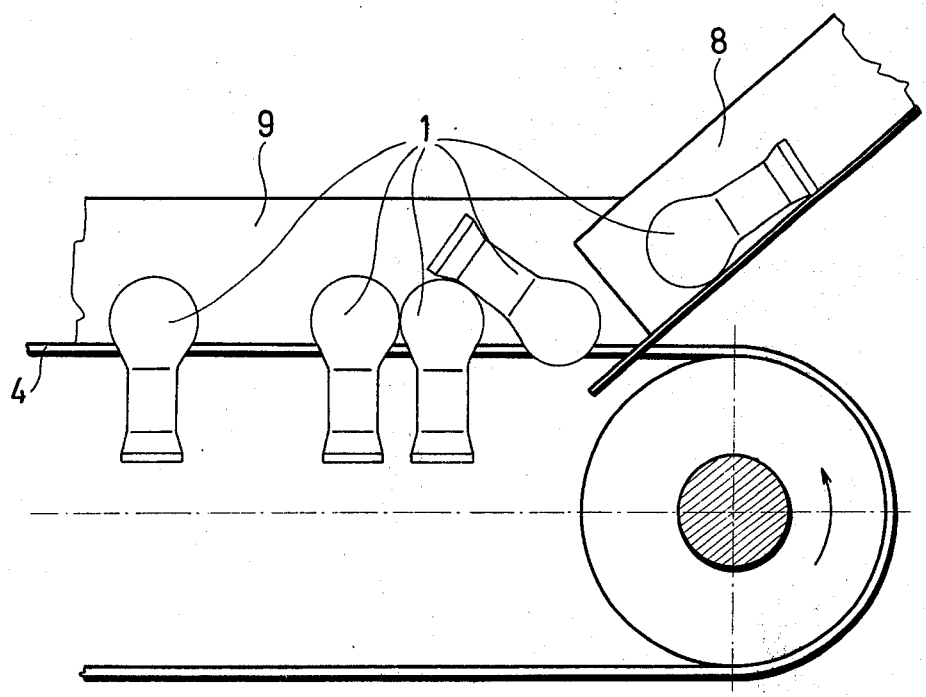
FIG. 1a illustrates the conventional solution with conveying elements in side view.
FIG. 1b illustrates the apparatus of FIG. 1a in plan view.
Figure 1:
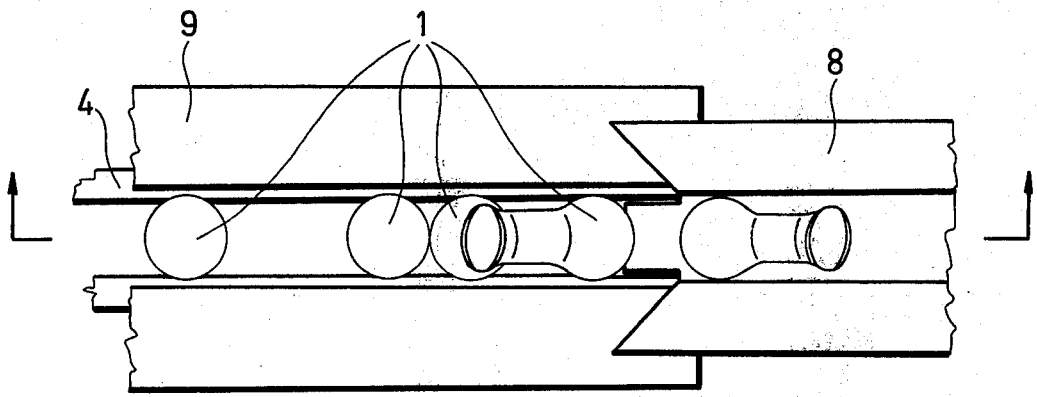

In theory, the two conveying elements 4 are completely sufficient for suitable positioning, since the glass bulbs 1 passing from the channel 8 on to the conveying elements 4 swing by themselves, owing to the position of their center of gravity, with their neck portion between the two conveying elements 4. But in actual practice, however, this is not always found to occur; surprisingly, it happens relatively frequently that, as FIG. 1 shows, of two glass bulbs which are situated close behind another, one of them becomes disposed with its neck portion 2 lying on the bulbous portion 3 of the adjacent bulb. This causes disturbance in the separating or distributing unit.

The apparatus according to the invention shown in FIGS. 2, 3a, 3b and 3c obviates this frequent defect by using regulating elements 5.

The regulating elements 5 are arranged in pairs on the conveying elements 4, which run parallel to one another. Their spacing from one another in a direction perpendicular to the conveying elements 4 is less than the spacing $a$ of the conveying elements 4 (see FIG. 2) but larger than the width $c$ of the neck portion 2. It must also be insured that the regulating elements 5 do not hinder the movement of the conveying elements 4. The construction must be made such that because of the friction which occurs between the conveying elements 4 and a bulb 1 another bulb 1 is pushed on to the regulating element and the ends 6 of the regulating elements 5 inhibit direct contact between the bulb 1 and the conveying elements 4, i.e., friction. This elimination of friction is achieved by arranging the parts so that, in the manner shown in FIG. 3c, the ends 6 of the regulating elements 5 come to be disposed between the conveying elements 4 and the bulb 1.

If several pairs of regulating elements 5 are used for a pair of conveying elements 4, the minimum spacing of the pairs from one another amounts to twice the maximum diameter, that is the $b$-dimension, of the bulb, that is to say $2b$.

The functional length of the regulating elements 5 is made smaller than the $b$-dimension of the bulb on the basis of practical experience, and is at least such that a bulb 1 can be accommodated thereon during operation. Of course, the functional length of the regulating element 5 may also be greater than the size of the bulb 1.

The glass bulb 1 in question is pushed by the next glass bulb 1 onto the regulating elements 5, and the pushing force resulting from the friction between the glass bulb 1 and the conveying elements 4 causes the bulb situated on the regulating elements to tip over.

If two bulbs 1 reach the regulating elements 5 in such a manner that the neck portion 2 of the first bulb 1 rests on the bulbous portion 3 of the second bulb, the first bulb passes the regulating elements 5 since on reaching the regulating elements 5 the second bulb pushes the first bulb onto and over the said elements. The second bulb, since there is no further bulb following directly behind it, stops at the regulating element 5. Since the first bulb moves onwards without the second bulb following it, its neck portion swings downwards between the two conveying elements 4.

It is a comparable situation when the two bulbs arrive in such manner that the neck portion 2 of the second bulb rests on the bulbous portion 3 of the first. In this case also, on arrival at the regulating elements 5 the second bulb pushes the first onto and over the regulating elements; the second bulb remains resting on the regulating elements while the bulbous portion 3 of the first bulb again enters between the conveying elements 4, and the frictional force which occurs between the bulb and the conveying elements draws the neck portion 2 away from the bulbous portion 3 of the following bulb, and the neck portion 2 swings over between the two conveying elements 4.

Figure 3:
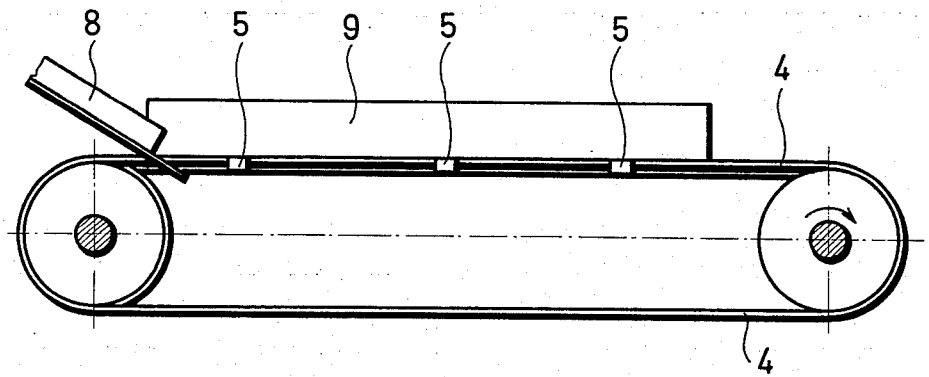
FIG. 3a illustrates in side view a constructional form of the apparatus according to the invention.
FIG. 3b illustrates the same constructional form as FIG. 3a but in plan view; and, FIG. 3c is a view in section through a regulating element.
Figure 3:
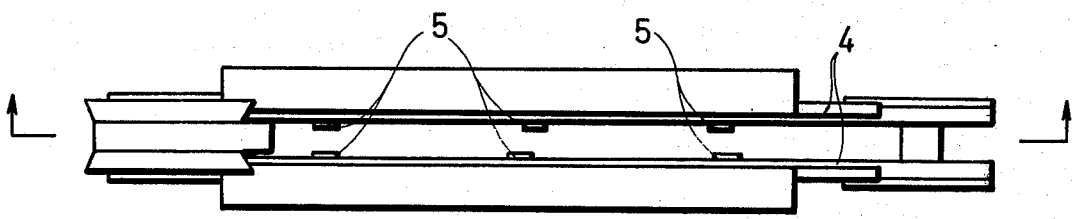
Figure 3:
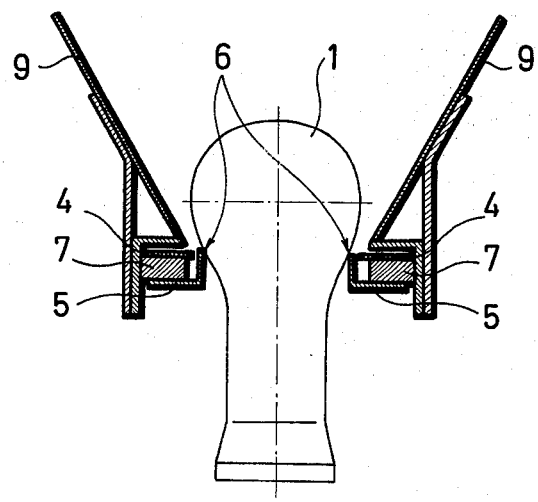

In view of the inertia of the feed apparatus (which passes a large number of bulbs at the same time onto the conveying elements 4) it has been found convenient in actual practice to arrange a plurality of regulating elements with a spacing of $6b$, $b$ being the diameter of the bulbous portion of the bulb, since if three or more bulbs arrive shortly after one another, a number of bulbs which is smaller by one pass onward through the regulating element. If one of these bulbs is incorrectly positioned, this condition still exists after the regulating element 5. In this case the positioning is effected by the next regulating element 5 downstream, as shown in FIGS. 3a and 3b. Instead of using mechanical elements for regulating elements, it is also possible to blow in air to regulate the bulbs in their travel.

Although the invention is illustrated and described with reference to a plurality of embodiments thereof, it is to be expressly understood that it is in no way limited to the disclosure of such a plurality of preferred embodiments, but is capable of numerous modifications within the scope of the appended claims.

What is claimed is:

1. An apparatus for the arranging, separating and positioning of individual items which have a bulbous portion and a neck portion, the apparatus comprising two mutually spaced parallel, movable endless conveying elements, and pairs of elements for regulating the positioning of the items arranged at the adjacent sides of the conveying elements, the spacing of the regulating elements in the direction at right angles to the length of the conveying elements is larger than the greatest width of the neck portion.

2. An apparatus according claim 1, wherein the spacing of the regulating elements in a direction at right angles to the length of the conveying elements is larger than the greatest width of the neck portion, while their spacing in the direction of the length of the conveying elements corresponds at least to the greatest width of the bulbous portion, the length of each regulating elements ranging from nearly zero to ten times the greatest width of the bulbous portion.

* * * * *